(12) United States Patent
Elze et al.

(10) Patent No.: US 6,220,800 B1
(45) Date of Patent: Apr. 24, 2001

(54) METHOD AND APPARATUS TO PROTECT REFRIGERATED PRODUCTS

(76) Inventors: Olaf Elze, 1220 Windsor Way, Redwood City, CA (US) 94061; Helmut R Elze, 1545 Green St. #303, San Francisco, CA (US) 94103; Mark J. Caires, 2196 Quinn Ave., Santa Clara, CA (US) 95051-1855

( * ) Notice: Subject to any disclaimer, the term of this patent is extended or adjusted under 35 U.S.C. 154(b) by 0 days.

(21) Appl. No.: 09/290,719

(22) Filed: Apr. 12, 1999

(51) Int. Cl.⁷ ............................................. B60P 7/16
(52) U.S. Cl. ............................ 410/119; 410/117; 410/155
(58) Field of Search .................................. 410/117, 118, 410/119, 125, 154, 155; 206/522, 593

(56) References Cited

U.S. PATENT DOCUMENTS

| 4,044,693 | * | 8/1977 | Ramsey, Jr. ............................ 410/119 |
| 4,349,303 | * | 9/1982 | Liebel et al. .......................... 410/154 |
| 4,585,381 | * | 4/1986 | Boyse ..................................... 410/154 |
| 5,263,801 | * | 11/1993 | Keenan et al. ........................ 410/119 |
| 5,350,000 | * | 9/1994 | Wang ................................. 206/522 X |
| 5,660,512 | | 8/1997 | Elze et al. ............................ 410/124 |
| 5,676,509 | * | 10/1997 | Enzu ..................................... 410/119 |
| 5,678,968 | * | 10/1997 | Bourgeois et al. ................... 410/119 |
| 5,678,969 | * | 10/1997 | Farrell et al. ........................ 410/119 |
| 5,730,564 | * | 3/1998 | Howlett, Jr. .......................... 410/119 |
| 5,762,198 | * | 6/1998 | Hung ................................... 206/522 |

* cited by examiner

Primary Examiner—Stephen T. Gordon
(74) Attorney, Agent, or Firm—Robert Samuel Smith

(57) ABSTRACT

An apparatus and method for storing boxes of perishable products and providing that refrigerated air flows relatively uniformly through the stack. The apparatus is an elongated inflatable bag divided into sections by baffles, each section being inflatable independent of the other sections. The bag forms a roof over a corridor between two rows of stacks and a panel encloses one end of the corridor opposite the opposite end which is closed off by the cargo wall. Refrigerated air forced into the corridor at floor level at one end of the corridor is diverted through the stacks of boxes.

6 Claims, 2 Drawing Sheets

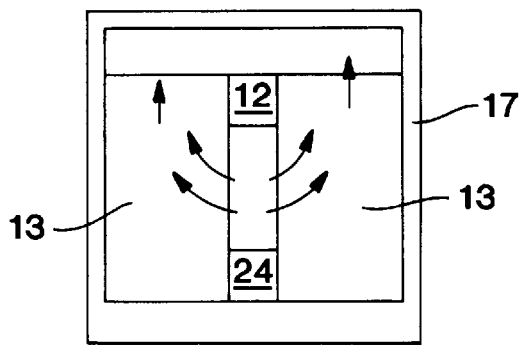
FIG. 3
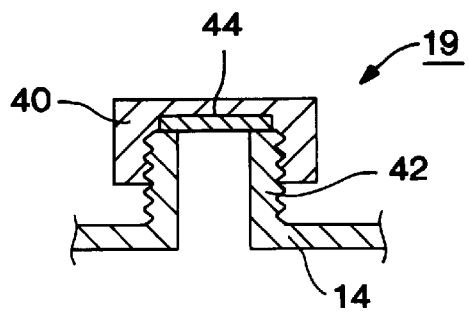
FIG. 4
1. PROVIDE TUBE OF FIVE SECTIONS
2. LOAD FOUR PALLETS
3. POSITION AIRBAG AND SECURE FLAPS
4. INFLATE LEAD AIRBAG SECTION
5. LOAD ADDITIONAL PALLETS AND POSITION AND INFLATE EACH AIRBAG SECTION
6. POSITION END PANEL
FIG. 5

METHOD AND APPARATUS TO PROTECT REFRIGERATED PRODUCTS

FIELD OF THE INVENTION

This invention relates to air bags such as are used to protect products shipped in trucks and particularly to an air bag that distributes refrigerated air flow to obtain a more even temperature.

BACKGROUND AND INFORMATION DISCLOSURE

In transporting products in the enclosed cargo space of trucks and containers, inflatable air bags are used to stabilize the load of the cargo to prevent damage to either the truck or cargo. Variations of this practice have appeared in the patent literature.

For example U.S. Pat. No. 5,730,564 to Howlett discloses a cargo supporting air bag having inflation indicating means and a method for determining proper inflation of spaced loads.

U.S. Pat. No. 5,263,801 to Keenan et al discloses an airbag for use in a cargo bay of a transport vehicle for stabilizing a cargo of drums or rolls.

In the transportation of perishable products such as fruits and vegetables, the produce is normally packed onto pallets and which are then placed in the cargo space of a refrigerated enclosure such as a truck trailer or container. None of the foregoing references disclosure address the problem of maintaining a uniformly even temperature in a refrigerated cargo space containing refrigerated fruits and/or vegetables.

Uneven temperature can be a problem resulting from a loss or gain of heat through the walls of the cargo hold during shipment. U.S. Pat. No. 5,660,512 discloses an airbag that is positionable between the wall of the container and pallets holding product in the cargo space. The bags are spacers that separate the cargo from the walls of the cargo hold.

However, this disclosure does not address the problem of uneven flow of refrigerated air through the pallets in the cargo chamber. This uneven air flow results in troublesome differences of temperature in various locations of the cargo chamber.

SUMMARY OF THE INVENTION

It is an object of this invention to provide a support system that stabilizes a load of product, particularly pallets stacked with boxes of fruits and/or vegetables, and provides for uniform flow of of refrigerated air through the cargo of product.

It is a further object to provide an air bag that accommodates the size of the standard container or truck bed and which can carry two rows of pallets, side by side where each pallet is 48 by 40 inches.

This invention is directed toward an apparatus and for distributing refrigerated air in an enclosed cargo bed in which the pallets are arranged two abreast across the width of the cargo bed. The two rows of pallets are spaced from one another so that a corridor is created bounded by a stack of boxes of product on a pallet on each side of the corridor. An elongated square tubular air bag is provided having a length equal to the length of the cargo space. The bag comprises sections, each section joined end to end with its neighboring sections with a baffle between each section and each section having its own air valve for inflating the section independently from the neighboring sections. The square tubular air bag is positioned at a level of the tops of the stacks and between the stacks so that the closd ceiling of the corridor between the rows of pallets is formed by the air bag. To begin loading the cargo, the first four pallets, each holding a stack of boxes, are placed in position at the cab end of the cargo space. The lead bag section is secured in place straddling the corridor by taping side flaps of the end section to the first first pallets and inflated. As each set of four pallets is added, the succeeding section is extended over the corridor and inflated. The last section is shorter than the other sections and is inflate between the last two pallets. A rear enclosure of the corridor is created by positioning an additional vinyl strip over the opening.

Refrigerated air is pumped into the cargo space from a source located at floor level of the corridor at the cab end of the corridor. Refrigerated air flowing through the length of the corridor is diverted by the airbag roof of the corridor to flow through the stacks of boxes supported on the pallets thereby providing a uniform flow of refrigerated air. through the stacks.

BRIEF DESCRIPTION OF THE FIGURES

FIG. 3 is a sectional view showing the flow pattern of refrigerated air.

FIG. 4 shows details of the air release.

FIG. 5 is a flow chart listing the steps in performing the method of this invention.

DESCRIPTION OF THE BEST MODE

Figure 1:
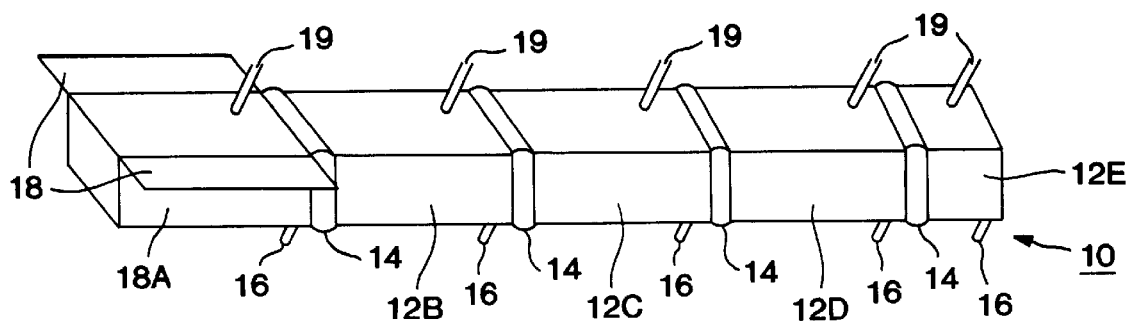
FIG. 1 shows the square tubular sectionalized air bag of this invention.

Turning now to a description of the drawings, FIG. 1 shows the elongated tubular airbag 10 of this invention comprising five sections, 12A–E. The bag is made of durable flexible pvc. A baffle 14 separates each section from its neighboring section and each section is provided with a valve 16 so that each section can be inflated independently. To accommodate the typical situation of two rows of nine pallets, each pallet being four feet long, sections 12A–D are each eight feet long, and the last section 12E is four feet long.

The lead section 12A is provided with a pair of flaps 18, each flap having an edge secured to the lead section and arranged opposite one another along the length of the section 12A.

Figure 2:
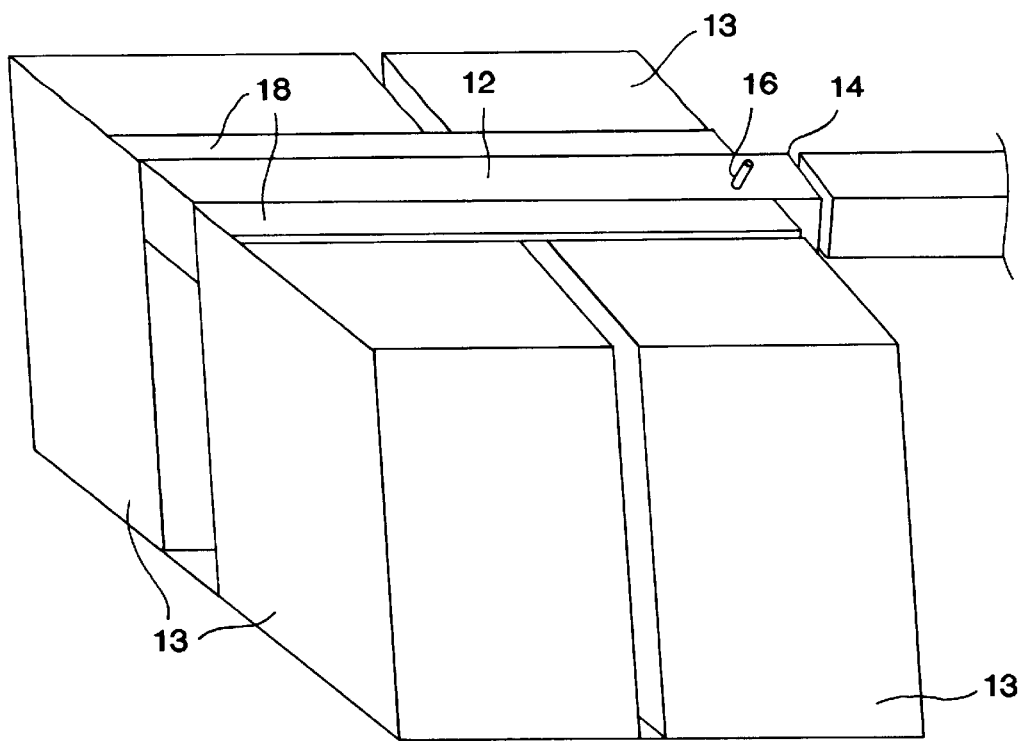
FIG. 2 shows the method of attaching the lead section to the first stack of boxes.

FIG. 2 shows the first step in loading the cargo which is to position the first four pallets each holding a stack of boxes 13, two abreast at the cab end of the cargo space. The lead section 12A is secured in place by taping each flap 18 to the top surface of one stack opposite the other flap 18 taped to the top surface of the other stack. The lead stack is then inflated through valve 16.

As each pair of pallets is loaded into the cargo space, the air bag is extended over the corridor between stacks and the section is inflated through its own valve 16.

FIG. 3 is a sectional view showing the pattern of air flow of the refrigerated air entering at location 24 in cargo hold 17 and diverted through the stack of boxes 13 by the air bag 12.

An air release 19 on each section permits rapid deflation of the section when the cargo reaches its destination. FIG. 4 shows details of the air release 19 including a threaded nipple 42 extending away from the bag 14 with a cap 40 screwed down on the nipple 42 and pressing a sealing plug 44 to close off the nipple opening. It is a feature of this invention to construct and design the air release to be separate from the air inlet needle valve 16 to make the air release large enough so as to be able to conveniently and rapidly release the air simply by unscrewing the cap 40.

FIG. 5 is a flow chart showing the steps in loading the cargo hold according to the method of the invention.

In step 1 an elongated tubular air bag of flexible is provided comprising five sections, 12A–E, each section separated from its neighboring section by a baffle and each section is provided with a valve 16 and a quick air release. The lead section 12A is provided with a pair of flaps 18, each flap having an edge secured to the lead section opposite the other flap.

In step 2, the first four pallets stacked with boxes are positioned two abreast at the cab end of the cargo hold with a center corridor between pallets on one side and pallets on the other side of the cargo hold.

In step 3, the lead section of the air bag is positioned and secured by securing flaps having edges attached to the end section along the top edges of the corridor.

In step 4, the lead section is inflated.

In step 5 additional pairs of stacks on pallets are positioned and each succeeding section is positioned over the corridor and inflated.

In step 6 panel is positioned vertically to close off the end of the corridor.

There has been described a method for providing uniform cooling of produce stored in boxes and stacked on pallets in order to maintain freshness of the product during shipment. The method features an elongated sectionalized air bag which is used to form an enclosed corridor through which refrigerated air passes and is diverted by the air bag to flow through the stacks.

Variations and modifications of the method and apparatus may be contemplated which are within the scope of the invention. For example, various materials may be used to fabricate the bag such as reinforced rubber. The flaps on the lead section may be secured to the top of the stacks of boxes by nails, screws or other fasteners. I therefore wish to define the scope of my invention by the appended claims.

We claim:

1. An apparatus for stabilizing stacks of boxes on pallets in a cargo hold and establishing a uniform flow of refrigerated air in through said stacks of boxes, which comprises:

an air bag having an elongated tubular shape;

said air bag being made of a flexible material;

a plurality of baffles arranged to divide said air bag into a plurality of sections, each section separated from its neighboring section by one of said plurality of baffles, beginning with a lead section;

each section having a valve connectable to a source of compressed air for inflating said section;

a pair of flaps;

one said flap of said pair of flaps having an edge secured along one side of said lead section and said other flap of said pair of flaps having an edge secured along an opposite side of said lead section;

means for attaching each said flap to a surface.

2. The apparatus of claim 1 wherein each section has a quick release valve.

3. The apparatus of claim 1 wherein said plurality of sections is five sections, said lead section and a following three of said sections are about eight feet long and a last one of said sections is about four feet long.

4. The apparatus of claim 1 wherein each section when fully inflated is about twelve inches high and about fifteen inches wide.

5. The apparatus of claim 1 wherein said means for attaching is adhesive tape.

6. An apparatus for forming an enclosure of a corridor between two rows of a plurality of stacks of boxes in a cargo hold wherein one row is parallel to and spaced from the other row and said stacks have substantially the same height and said corridor is bounded on one end by a wall of said cargo hold, providing that refrigerated air forced into said corridor is diverted through said stacks, said apparatus comprising:

an air bag having an elongated tubular shape;

said air bag being made of a flexible material;

a plurality of baffles arranged to divide said air bag into a plurality of sections, each section separated from its neighboring section by one of said plurality of baffles, beginning with a lead section;

each section having a valve connectable to a source of compressed air for inflating said section;

a pair of flaps;

one said flap of said pair of flaps having an edge secured along one side of said lead section and another flap of said pair of flaps having an edge secured along an opposite side of said lead section;

means for attaching each said flap to a top surface of a first one respectively of said stack of boxes proximal to said wall of said cargo hold;

a panel positionable on an open end of said corridor providing that refrigerated air forced into said corridor is diverted through said stacks.

* * * * *